Patented Aug. 20, 1940

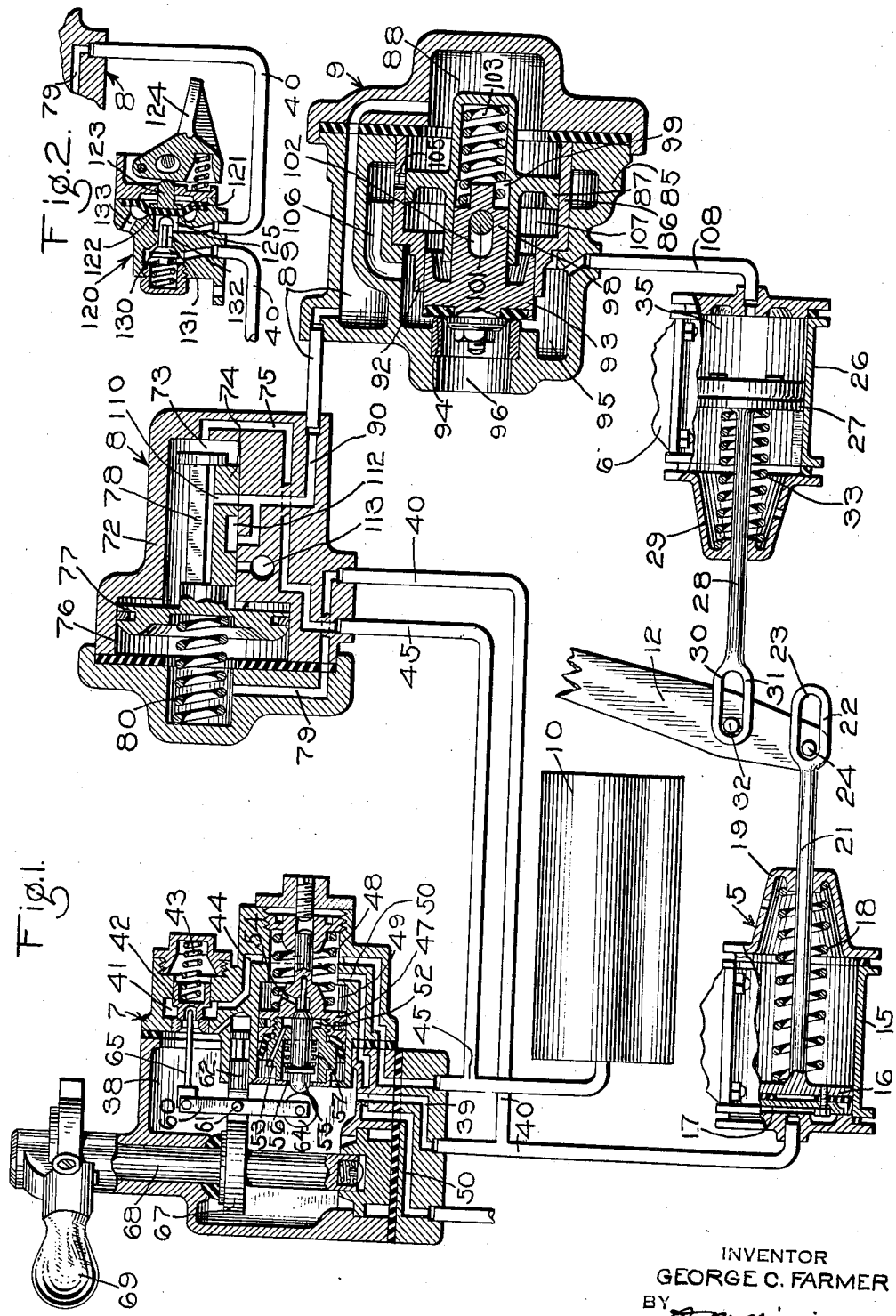

2,211,890

UNITED STATES PATENT OFFICE 2,211,890

BRAKE MECHANISM

George C. Farmer, Chicago, Ill., assignor to The Westinghouse Air Brake Company, Wilmerding, Pa., a corporation of Pennsylvania Application June 29, 1939, Serial No. 281,871

10 Claims. (Cl. 303—2)

This invention relates to brake equipment, and more particularly to a fluid pressure controlled brake apparatus having automatic safety features and suitable for use in controlling vehicles or industrial machines such as cranes.

It has been proposed to employ a fluid pressure brake apparatus of simple and economical design for controlling heavy industrial machines, such as hoisting devices and cranes, which type of brake apparatus in practical use is adapted for effective operation at all times, and provides the high degree of braking power and flexibility of control required for this class of machinery. In order to ensure further safety in operation, however, it is desirable that additional mechanically energized brake means be associated with the main fluid pressure brake, and arranged either to operate automatically upon the accidental loss of fluid under pressure which would render the fluid pressure brake ineffective, or to be conditioned to serve as a holding brake.

One object of my invention is to provide a fluid pressure brake equipment having the above features of construction, and comprising a main brake means operative by fluid under pressure, and operatively interlocked with an auxiliary brake means arranged to be actuated by mechanical power, either in response to manual control, or automatically upon excessive reduction in the pressure of fluid ordinarily supplied for operating the fluid pressure brake means.

Another object of the invention is to provide a brake equipment including a control pipe normally charged with fluid under pressure, fluid pressure brake means operative in accordance with variations in the pressure in said control pipe above a predetermined minimum value, and auxiliary safety brake means operative under the force exerted by a normally loaded spring in response to reduction in the control pipe pressure below the predetermined value.

It is a further object of the invention to provide a brake equipment of the above type which may be employed either with the industrial machinery mentioned or for controlling railway cars and other vehicles.

Other objects and advantages of the invention will be apparent from the following description thereof, taken in connection with the accompanying drawing, wherein Fig. 1 is a diagrammatic, sectional view of a brake equipment constructed according to the invention; and Fig. 2 is a fragmentary sectional view of the same equipment in modified form.

Referring to the drawing, the brake equipment comprises a fluid pressure brake cylinder device 5, a spring brake cylinder device 6, a brake valve device 7, a control valve device 8, a quick release valve device 9 and a main reservoir 10. It will be understood that the brake equipment shown in the drawings is adapted to be associated with suitable friction brake apparatus carried by the crane or other machine, which is not shown in detail but includes a brake operating lever 12 adapted to be actuated by either the fluid pressure brake cylinder device 5 or spring brake cylinder device 6, as hereinafter explained.

The brake lever 12 is adapted to be normally actuated in accordance with operation of the fluid pressure brake cylinder device 5, which comprises a cylinder 15 having slidably mounted therein a piston 16, which is subject on one side to the pressure of fluid in a piston chamber 17, and on the other side to the force of a coil spring 18 that is interposed between the piston and an end cover 19 secured to the cylinder. The piston 16 is connected to a piston rod 21, which extends outwardly through a suitable aperture formed in the end cover 19 and carries at the other end thereof an enlarged portion 22 having formed therein a slot 23, through which extends a pin 24 that is carried on the lower end of the brake operating lever 12. The spring 18 within the brake cylinder 5 is designed to exert sufficient force to prevent movement of the piston 16 toward brake applying position until the pressure of fluid supplied to the chamber 17 exceeds a predetermined minimum value, which may, for example, be about ten pounds per square inch.

The spring brake cylinder 6 is adapted to actuate the brake operating lever 12 only in case the fluid pressure brake cylinder device 5 has been rendered inoperative due to accident, and comprises a cylinder 26 having slidably mounted therein a piston 27 which is provided with a piston rod 28 slidably mounted in a suitable bore formed in an end cover 29 carried by the cylinder. The outer end 30 of piston rod 28 is suitably enlarged and has formed therein a slot 31 adapted to receive a pin 32 mounted on the operating brake lever 12 adjacent the lower end thereof. A powerful coil spring 33 is interposed between the end cover 29 and the piston 27 and is adapted to exert sufficient force against the piston for effecting operation of the piston rod 28 and brake lever 12 to apply the brakes in response to discharge of fluid under pressure from a piston chamber 35 in the cylinder, which chamber is normally charged with fluid at the pressure of that in the main reservoir 10, in a manner hereinafter explained.

The brake valve device 7 may be of any suitable self-lapping type operable either by a foot pedal or by a handle, and as illustrated in the drawing is similar in construction to the brake valve device disclosed in the United States Patent No. 2,042,112, issued May 26, 1936, to Lynn and Bush, and assigned to the assignee of the present application. As illustrated, the brake valve device 7 comprises a casing structure having formed therein a pressure chamber 38 which communicates by way of a passage 39 with a control pipe 40, which in turn is connected to the piston chamber 17 of the brake cylinder 5. A valve chamber 41 is formed in the casing of the brake valve device 7 and has mounted therein a supply valve 42, which is normally urged inwardly to its seated position under the pressure of a coil spring 43, and is adapted to control communication to the pressure chamber 38 from a supply passage 44 formed in the casing and communicating by way of a pipe 45 with the main reservoir 10.

Mounted in a suitable bore formed in the casing and in parallel relation with the supply valve 42 is a piston 47, which is subject on one side to the pressure of fluid in the chamber 38 and on the other side to the opposing force of a coil spring 48 that is disposed in a chamber 49 communicating by way of a passage 50 with the atmosphere. The piston 47 has formed therein a valve chamber 52 which communicates by way of a passage 53 formed in the piston with the chamber 38 and through a passage 54 with the chamber 49, and within which valve chamber is mounted a release valve 55 controlling communication from the valve chamber to the passage 54. The release valve 55 has a plunger portion carrying a collar 56, against which a coil spring 57 is adapted to act for urging the release valve toward unseated position.

The supply valve 42 and release valve 55 are both adapted to be controlled by operation of a lever 60 which is pivotally mounted intermediate its ends on a pin 61 carried by a plunger 62 that is slidably mounted in a suitable bore formed in the casing, one end of the lever being provided with a roller 64 engageable with the inner end of the stem of the release valve 55, and the other end of the lever being pivotally connected to a rod 65 which is operatively aligned with the supply valve 42. The end of the plunger 62 within the pressure chamber 38 is adapted to be slidably engaged by the surface of a cam 67 which is secured to a rotatable shaft 68 and is adapted to be turned through the medium of a handle 69 mounted on the shaft.

As is apparent in the drawing, the spring 43 is adapted to exert a greater force than that of the spring 56, while the spring 48 is stronger than both the springs 43 and 56 combined. It will readily be understood that, when the handle 69 is operated to turn the cam 67 for forcing the plunger 62 to the right, as viewed in the drawing, the lever 60 will be fulcrumed on the roller 64 as it is turned in a clockwise direction by the pin 61 for causing the rod 65 to unseat the supply valve 42 against the force of a spring 43, the release valve 55 being meanwhile held in seated position against the force of the spring 56. The pressure of fluid consequently supplied to the pressure chamber 38 then acts against the piston 47 in opposition to the spring 48, and the piston is thereby moved to permit turning of the lever 60 in a counterclockwise direction about the pin 61 under the force of the spring 43, until the supply valve 42 is again seated. The pressure of fluid thus built up in the chamber 38 is proportional to the degree of movement of cam 67 by the brake valve handle.

To release fluid under pressure from the chamber 38 the brake valve handle is turned in the opposite direction for drawing the cam surface away from the plunger 62, whereupon the spring 56 becomes effective to unseat the valve 55, the lever 60 being at the same time turned in the clockwise direction about the pin 61. When the fluid pressure in the chamber 38 becomes reduced sufficiently, the piston 47 is moved inwardly under the pressure of the spring 48 until the valve seat carried by the piston engages the valve 55 for cutting off further release of fluid.

According to the present invention, the brake valve device 7 is constructed and arranged to maintain the hereinbefore mentioned minimum fluid pressure (assumed as ten pounds per square inch) in the control pipe 40 when the brake pipe handle is disposed in release position.

The control valve device 8 comprises a casing 72 having formed therein a valve chamber 73 which contains a slide valve 74, and which is at all times in communication by way of a passage 75 with the main reservoir pipe 45. A piston bore 76 is formed within the casing 72 adjacent the valve chamber and has slidably mounted therein a piston 77, which is adapted to actuate the slide valve 74 through the medium of a notched stem 78. The piston bore 76 is connected through a passage 79 with control pipe 40, and has disposed therein a coil spring 80 which is adapted to act on the piston 77 in opposition to the pressure of fluid in the valve chamber 73. The spring 80 is adapted to exert a force sufficient to move the piston 77 into the position shown in the drawing against the pressure of fluid supplied to the chamber 73 from the main reservoir, so long as the pressure of fluid in the bore 76 is not reduced below the predetermined minimum value normally maintained therein by the brake valve device 7 as hereinbefore explained.

The quick release valve device 9 comprises a casing 85 having a bushing 86 mounted therein, within which bushing is disposed a piston 87 that is subject on one side to the pressure of fluid in a chamber 88 communicating by way of a passage and pipe 89 with a passage 90 formed in the casing of the valve device 8 and leading to the seat of the slide valve 74. The bushing 86 has a reduced portion 92 within which is slidably mounted a discharge valve member 93, which is adapted to engage a seat 94 carried by the casing, for controlling communication from the chamber 95 to an atmospheric vent passage 96. The valve member 93 has formed thereon a stem 98 which is slidably engaged in a central bore 99 provided in the piston 87, and is interlocked with the piston by means of a pin 101 secured to the piston and extending through a slot 102 formed in the stem. The valve member 93 is thus adapted to have a limited lost motion with respect to the piston 87. A coil spring 103 is interposed between the valve stem 98 and the inner wall of the bore 99 of the piston for urging the valve member and piston apart.

In the drawing, the piston 87 is represented as held in its innermost position against the force of the spring 103 under the pressure of fluid in the chamber 88, while the chamber is connected through a port 105 formed in the bushing 86, and a passage 106, with the chamber 95, as will hereinafter be more fully explained. It will be noted that a chamber 107 is formed between the piston 87 and the valve member 93, which chamber is in restricted communication with the chamber 95 past the periphery of the valve member 93, which is relatively loosely fitted within the portion 92 of the bushing. The chamber 95 is in turn connected by way of a pipe 108 with piston chamber 35 of the spring brake cylinder device 6.

Operation

Assuming that the main reservoir 10 is charged with fluid under pressure by operation of the usual compressor (not shown in the drawing), and that the brake valve device 7 is disposed in release position, fluid under pressure flows from the main reservoir through the pipe 45 and passage 44 and past the valve 42 in the brake valve device to the pressure chamber 38 until the pressure of fluid in that chamber is increased to the predetermined minimum value (ten pounds) normally maintained therein, as already explained. The self-lapping operation of the brake valve device 7 will be understood from the description hereinbefore presented. Fluid under pressure at the same time is supplied from the pressure chamber 38 by way of the control pipe 40 to the piston chamber 17 of the brake cylinder device 5, which, however, remains in the release position shown in the drawing, since the spring 18 is adapted to resist movement of the piston 16 unless the fluid pressure acting thereon should exceed the predetermined minimum value.

Fluid at the predetermined minimum pressure just referred to is also supplied from the control pipe 40 to the bore 76 of the control valve device 8 and augments the force of the spring 80 sufficiently to force the piston 77 and slide valve 74 into the normal position illustrated, against the opposing pressure of fluid supplied to the valve chamber 73 from the main reservoir 10 by way of the pipe 45 and passage 75. With the slide valve 74 in the normal position, fluid at main reservoir pressure is supplied from the valve chamber 73 through a port 110 in the slide valve, the passage 90 which at this time registers with that port, and pipe and passage 89 to the chamber 88 of the quick release valve device 9. The piston 87 is then forced against the pressure of the spring 103 for urging the valve member 93 into seating engagement with the seat 94 while uncovering the port 105 in the bushing, through which port together with the passage 106 fluid at main reservoir pressure is then supplied to the chamber 95, and thence through the pipe 108 to the piston chamber 35 of the spring brake cylinder device 6. Fluid under pressure in the chamber 95 at the same time leaks past the valve member 93 to the chamber 107, and upon resultant equalization of the pressures in that chamber and in the chamber 88, the piston 87 is shifted to the right, as viewed in the drawing, by the force of the spring 103 until the port 105 is closed, it being understood that the valve member 93 remains in seated position under the pressure of fluid in chamber 107.

Fluid at main reservoir pressure supplied to the piston chamber 35 of the spring brake cylinder device, in the manner just explained, forces the piston 27 and piston rod 28 outwardly against the opposing pressure of the spring 33, and into the release position shown in the drawing, in which position the piston rod 28 is ineffective to interfere with any operation of the brake application lever 12 in the usual manner by the brake cylinder device 5. The brake lever 12 is consequently held in its release position as illustrated by suitable biasing means associated therewith but not shown in the drawing.

If it is desired to effect an application of the fluid pressure brake apparatus, the handle 59 is moved to any position within an application zone, thereby effecting operation in the usual manner of the valve mechanism of the self-lapping brake valve device 7 to increase the pressure of fluid in the pressure chamber 38 to a degree corresponding with the extent of movement of the handle. Fluid at the increased pressure thus supplied to the pressure chamber 38 flows therefrom through the passage 39 and pipe 40 to piston chamber 17 of the brake cylinder device 5, and the piston 16 is then moved against the opposing force of the spring 18 to shift the piston rod 21 outwardly or to the right as shown in the drawing, thereby effecting operation of the brake lever 12 to apply the friction brake mechanism with which it is associated. The pin 32 carried by the brake rod is at the same time adapted to ride in the slot 31 of the piston rod 28, so that the spring brake cylinder device 6 is ineffective to interfere with the application of the brakes initiated by operation of the brake valve device 7.

The increase in the pressure of fluid in the control pipe 40 is of course ineffective to alter the normal position in which the piston 77 and slide valve 74 of the control valve device 8 are held.

To effect the release of the brakes, the handle 69 of the brake valve device is returned to release position, and the self-lapping valve mechanism of the brake valve device then becomes operative in the manner hereinbefore explained to reduce the pressure of fluid in the pressure chamber 38 and in the piston chamber 17 connected thereto to the predetermined minimum value normally maintained therein, whereupon the spring 18 of the brake cylinder device 5 becomes effective to return the piston 16 to release position.

If the pressure of fluid in the piston chamber 17 of the brake cylinder device 5 is reduced below the predetermined minimum value of pressure normally maintained therein, due to accidental breakage of the control pipe 40 or to another cause, the simultaneous reduction in the pressure of fluid in the piston bore 76 of the control valve device 8 causes movement of the piston 77 under the pressure of fluid in the valve chamber 73 against the force of the spring 80 for shifting the slide valve 74 to the left, as viewed in the drawing. During this movement of the slide valve the port 110 thereof is moved out of registration with the passage 90, which passage is subsequently connected through a cavity 112 in the valve to an atmospheric exhaust port 113, with the result that fluid under pressure is vented from the chamber 88 of the quick release valve device 9 to the atmosphere by way of the passage and pipe 89, passage 90, cavity 112 and port 113.

As the fluid pressure in the chamber 88 is thus suddenly reduced, the pressure of fluid in the chamber 107 acts against the piston 87, which will be observed to be larger in diameter than the valve member 93, and thereby forces the piston to the right for moving the valve member away from the seat 94, whereupon fluid under pressure is quickly vented from the piston chamber 35 of the spring brake cylinder device 6 by way of the pipe 108, chamber 95 and exhaust passage 96.

As the fluid pressure in the piston chamber 35 is thus reduced, the powerful spring 33 becomes effective to shift the piston 27 and piston rod 28 to the right, as viewed in the drawing, while the portion 30 of the piston rod acts through the medium of the pin 32 and the brake lever 12 to effect application of the brakes. The spring brake cylinder device 6 is then effective to hold the brakes applied until the fluid pressure brake system has been restored to operating order for again effecting supply of fluid at main reservoir pressure to the piston chamber 35.

Although fluid under pressure can flow from chamber 107 to chamber 95 around the periphery of valve 93 during the venting operation of the valve device 9 as just described, the flow is so restricted as not to impede full venting of the brake cylinder chamber 35.

As shown in Fig. 2, the spring-energized brake may be rendered operable as a holding brake by interposing in the control pipe 40, adjacent the control valve device 8, a suitable cut-off and discharge valve device such as a foot valve device 120, comprising a casing having mounted therein a diaphragm 121 adapted to be held in engagement with a seat 122 by means of a follower element 123 and pedal 124 against the pressure of fluid in a chamber 125, which communicates through pipe 40 with passage 79 of the control valve device 8. The chamber 125 also communicates with the other end of the pipe 40 by way of a chamber 130 containing a spring-pressed valve 131, which is normally held in unseated position through the medium of a stem 132 engaging the diaphragm 121. By releasing pedal 124, the operator can isolate the end of pipe 40 connected to passage 79, fluid under pressure therein being then vented to atmosphere through a passage 133, so as to effect application and holding of the brakes independently of the fluid pressure brake system.

It will thus be seen that, according to the invention, the brake equipment just described is adapted to be employed for controlling industrial machines such as cranes and hoisting drums, or for controlling vehicles, and comprises fluid pressure responsive apparatus operable under normal conditions for effecting application and release of the brakes, and auxiliary spring-energized mechanism operative in the event of failure of the fluid pressure system, or in response to manual control, to effect an application of the brakes and to hold the brakes applied until the fluid pressure system is again rendered operative.

While two illustrative embodiments of the invention have been described in detail, it is not my intention to limit its scope to those embodiments or otherwise than by the terms of the appended claims.

Having now described my invention, what I claim as new and desire to secure by Letters Patent, is:

1. In a fluid pressure brake equipment, in combination, a member adapted to be moved for effecting an application of the brakes, a brake cylinder device operative upon an increase in fluid pressure to actuate said member, mechanically operable means normally subject to fluid pressure and automatically responsive to a reduction in fluid pressure for actuating said member, a valve mechanism operable for controlling the supply and release of fluid under pressure to and from said brake cylinder device, and control valve means operatively interlocked with said valve mechanism for normally supplying fluid under pressure to said mechanically operated means to render said means ineffective to interfere with control of said movable member by said brake cylinder device, said control valve means being responsive to an inoperative condition of said brake cylinder device to vent fluid under pressure from said mechanically operable means.

2. A combined fluid pressure and mechanical brake equipment comprising the combination of a control pipe, control valve means normally functioning to maintain a predetermined fluid pressure in said pipe and operable to effect an increase in pressure of fluid therein, brake cylinder means operative upon an increase in the pressure of fluid in said control pipe to effect an application of the brakes, and normally inoperative spring-energized brake means automatically operative upon reduction in the pressure of fluid in said control pipe below said predetermined pressure to effect an application of the brakes.

3. In a brake mechanism, in combination, a brake lever normally disposed in a release position and operable to a brake application position, a control pipe normally charged with fluid at a predetermined pressure, fluid pressure brake means operable upon an increase in the pressure of fluid in the control pipe to effect movement of said brake lever to application position, mechanically energized brake means including an element operable upon reduction in the pressure of fluid in a chamber to effect movement of said brake lever to application position, and valve means normally supplying fluid under pressure to said chamber and responsive to a reduction in pressure of fluid in said control pipe below the predetermined value to vent fluid from said chamber.

4. In a brake mechanism, in combination, a brake lever normally disposed in a release position and operable to a brake application position, a control pipe normally charged with fluid at a predetermined pressure, fluid pressure brake means operable upon an increase in the pressure of fluid in the control pipe to effect movement of said brake lever to application position, and means comprising a normally loaded spring operable when released to move said brake lever to application position, and a mechanism subject to the pressure of fluid in the control pipe and operable while said control pipe pressure is above said predetermined value to effect loading of said spring, said mechanism being responsive to reduction in control pipe pressure below said predetermined value to release said spring for effecting an application of the brakes.

5. In a brake mechanism, in combination, a brake lever normally disposed in a release position and operable to a brake application position, a control pipe normally charged with fluid at a predetermined pressure, fluid pressure brake means operable upon an increase in the pressure of fluid in the control pipe to effect movement of said brake lever to application position, spring means operative when released to move said brake lever to application position, a movable abutment subject to the opposing pressures of said spring means and of fluid in a chamber, and valve means normally rendered operative by the predetermined pressure of fluid in said control pipe to maintain said chamber charged with fluid under pressure for loading said spring, said valve means being responsive to a reduction in control pipe pressure below said predetermined value to vent fluid from said chamber for thereby releasing said spring means.

6. A brake equipment comprising, in combination, a brake member normally disposed in a release position and movable therefrom to a brake application position, a brake cylinder device operative upon an increase in fluid pressure above a predetermined value to move said member to brake application position, a control pipe communicating with said brake cylinder device, a supply and release valve mechanism automatically operative to maintain said control pipe charged with fluid under at least said predetermined pressure and operable to effect variations in control pipe pressure above said predetermined value, biasing means automatically operative to effect movement of said brake member to application position, movable abutment means operable when subjected to fluid pressure to prevent operation of said biasing means, and a control valve device operative when the pressure of fluid in said control pipe equals or exceeds said predetermined value to supply fluid under pressure to said movable abutment means, said control valve device being operative upon reduction in control pipe pressure below said predetermined value to cut off said supply and to effect rapid venting of fluid under pressure from said movable abutment means.

7. A brake equipment comprising, in combination, a brake member normally disposed in a release position and movable therefrom to a brake application position, a brake cylinder device operative upon an increase in fluid pressure above a predetermined value to move said member to brake application position, a control pipe communicating with said brake cylinder device, a supply and release valve mechanism automatically operative to maintain said control pipe charged with fluid under at least said predetermined pressure and operable to effect variations in control pipe pressure above said predetermined value, biasing means operative to effect movement of said brake member to application position, movable abutment means operable by the pressure of fluid in a chamber to prevent operation of said biasing means, a control valve device operative when the pressure of fluid in said control pipe equals or exceeds said predetermined value to supply fluid under pressure to said chamber, and a quick release valve device cooperative with said control valve device upon a reduction in control pipe pressure below said predetermined value for effecting sudden discharge of fluid under pressure from said chamber.

8. In a brake equipment, in combination, a brake cylinder device adapted to be normally subjected to fluid pressure at a predetermined minimum value and operative upon an increase in fluid pressure above said predetermined value to effect an application of the brakes, a self-lapping brake valve device automatically operative under normal conditions to maintain said brake cylinder charged with fluid under at least said minimum pressure, and operable when moved to a brake application position to supply fluid at increased pressure to said brake cylinder, a normally restrained spring-energized motor device operative when released to effect an application of the brakes, and fluid pressure operated mechanism responsive to a reduction in the pressure of fluid in said brake cylinder below said predetermined minimum value to cause quick release of said spring-energized motor device.

9. In a brake mechanism, in combination, a brake lever normally disposed in a release position and operable to a brake application position, a control pipe normally charged with fluid at a predetermined pressure, fluid pressure brake means operable upon an increase in the pressure of fluid in the control pipe to effect movement of said brake lever to application position, mechanically energized brake means operable upon reduction in the pressure of fluid in said control pipe below said predetermined value to effect movement of said brake lever to application position, and a valve device interposed in said control pipe and operable to isolate the portion thereof adjacent said mechanically energized brake means while venting said isolated portion of the pipe, whereby the last-named brake means is rendered operative regardless of the condition of said fluid pressure brake means.

10. In a brake mechanism, in combination, a brake lever normally disposed in a release position and operable to a brake application position, a control pipe normally charged with fluid at a predetermined pressure, fluid pressure brake means operable upon an increase in the pressure of fluid in the control pipe to effect movement of said brake lever to application position, a spring, holding brake means operable by said spring when released for positioning said lever to apply the brakes, said holding brake means being operative while subject to at least the predetermined pressure of fluid in said control pipe to restrain said spring, and a cut-off and release valve device operative to relieve said holding brake means of said control pipe pressure, so that operation thereof to apply the brakes can be effected when desired and regardless of the condition of said fluid pressure brake means.

GEORGE C. FARMER.